United States Patent [19]
Mueller

[11] Patent Number: 6,027,776
[45] Date of Patent: *Feb. 22, 2000

[54] MULTILAYER FILMS FOR PACKAGING AND ADMINISTERING MEDICAL SOLUTIONS

[75] Inventor: Walter B. Mueller, Inman, S.C.

[73] Assignee: Cryovac, Inc., Duncan, S.C.

[*] Notice: This patent is subject to a terminal disclaimer.

[21] Appl. No.: 08/892,899

[22] Filed: Jul. 14, 1997

Related U.S. Application Data

[63] Continuation of application No. 08/408,668, Mar. 22, 1995, abandoned.

[51] Int. Cl.$^7$ ............................. B32B 27/08; B32B 27/32; B32B 27/34; B32B 27/36
[52] U.S. Cl. ......................... 428/35.2; 428/35.7; 428/212; 428/218; 428/412; 428/475.5; 428/475.8; 428/476.1; 428/476.3; 428/476.9; 428/483; 428/515; 428/516; 428/520; 428/522; 428/523
[58] Field of Search ................................ 428/35.2, 35.7, 428/347, 349, 354, 355 EN, 355 BL, 355 AC, 412, 475.5, 475.8, 476.1, 476.3, 476.9, 483, 515, 516, 520, 517, 519, 522, 523, 212, 218

[56] References Cited

U.S. PATENT DOCUMENTS

| | | | |
|---|---|---|---|
| 3,645,992 | 2/1972 | Elston | 260/80 |
| 4,188,443 | 2/1980 | Mueller et al. | 428/339 |

(List continued on next page.)

FOREIGN PATENT DOCUMENTS

| | | |
|---|---|---|
| 0 597 502 | 11/1993 | European Pat. Off. . |
| 0 600 425 A1 | 11/1993 | European Pat. Off. . |
| 0 641 647 | 9/1994 | European Pat. Off. . |
| WO 90/03414 | 4/1990 | WIPO . |
| WO 93/03093 | 2/1993 | WIPO . |

OTHER PUBLICATIONS

LLDPE Properties Tied to Plastics/Jan. '87 1–3.
New Family of Polyolefins Insite Technology 1–13.
Melting Points of Homogen Journal of Polymer s 1–11.
Effect of Crystallization Polymer Engineering 1–5.
Properties of Homogeneous B C Childress 1–30.
LLDPE Properties Tied To Plastics/Jan. '87.
New Family of Polyolefins Insite Technology May 1993.
Melting Points of Homogen Journal of Polymer s 1987.
Effect of Crystallization Polymer Engineering Aug. 1991.
Properties of Homogeneous B C Childress May 1994.
US Medical Grade Polyolefin Horizon Polymers/Fer 1 Jun. 1989.

*Primary Examiner*—Vivian Chen
*Attorney, Agent, or Firm*—Thomas C. Lagaly

[57] ABSTRACT

A multilayer film generally includes:
  a) an interior layer of homogeneous ethylene/alpha-olefin copolymer having a density ranging from about 0.89 to about 0.92 grams per cubic centimeter;
  b) a first exterior layer of a material selected from the group consisting of homopolymer or copolymer of polypropylene, a blend of homopolymer or copolymer of polypropylene and elastomer, high density polyethylene, and copolyester; and
  c) a second exterior layer of a material selected from the group consisting of polyamide, copolyamide, polyester, copolyester, high density polyethylene, polypropylene, propylene/ethylene copolymer, and polycarbonate, wherein a first adhesive layer is present between the interior layer and the first exterior layer and wherein a second adhesive layer is present between the interior layer and the second exterior layer. Such multilayer film is advantageously used to produce flexible pouches for the packaging and administration of medical solutions.

24 Claims, 1 Drawing Sheet

U.S. PATENT DOCUMENTS

| | | | |
|---|---|---|---|
| 4,274,900 | 6/1981 | Mueller et al. | 156/229 |
| 4,352,849 | 10/1982 | Mueller | 428/213 |
| 4,359,495 | 11/1982 | Schroeder et al. | 428/35 |
| 4,391,862 | 7/1983 | Bornstein et al. | 428/35 |
| 4,407,874 | 10/1983 | Gehrke | 428/35 |
| 4,528,220 | 7/1985 | Hwo | 428/35 |
| 4,643,926 | 2/1987 | Mueller | 428/35 |
| 4,726,997 | 2/1988 | Mueller et al. | 428/480 |
| 4,803,102 | 2/1989 | Raniere et al. | 428/35 |
| 4,816,343 | 3/1989 | Mueller et al. | 428/480 |
| 4,885,119 | 12/1989 | Mueller et al. | 264/22 |
| 4,891,253 | 1/1990 | Mueller | 428/35.2 |
| 4,966,795 | 10/1990 | Genske et al. | 428/34 |
| 5,206,075 | 4/1993 | Hodgson, Jr. | 428/216 |
| 5,241,031 | 8/1993 | Mehta | 526/348 |
| 5,272,236 | 12/1993 | Lai et al. | 526/348 |
| 5,278,272 | 1/1994 | Lai et al. | 526/348 |
| 5,324,555 | 6/1994 | Hughart et al. | 428/34.9 |
| 5,604,043 | 2/1997 | Ahlgren | 428/518 |

MULTILAYER FILMS FOR PACKAGING AND ADMINISTERING MEDICAL SOLUTIONS

This application is a continuation of application Ser. No. 08/408,668, filed Mar. 22, 1995, now abandoned.

BACKGROUND OF THE INVENTION

This invention relates to multilayer films and, more particularly, to multilayer films which are suitable for the packaging and administration of medical solutions in the form of flexible pouches.

Currently, it is common medical practice to supply medical solutions for parenteral (e.g., intravenous) administration in the form of disposible, flexible pouches. One class of such pouches is commonly referred to as an "I.V. bag." These pouches must meet a number of performance criteria, including collapsibility, optical clarity and transparency, high-temperature heat-resistance, and sufficient mechanical strength to withstand the rigors of the use environment. Medical solution pouches must also provide a sufficient barrier to the passage of moisture vapor and other gasses to prevent contamination of the solution contained therein.

Collapsibility is necessary in order to ensure proper and complete drainage of the pouch. Unlike rigid liquid containers which rely on air displacement for drainage, medical solution pouches rely on collapsibility for drainage. As the pouch drains, atmospheric pressure collapses the pouch at a rate which is proportional to the rate of drainage. In this manner, the pouch can be fully drained and at a substantially constant rate. In order for the pouch to be collapsible, the film from which the pouch is made must be flexible. If the film is too stiff, the pouch cannot drain fully and, as a result, the patient may not receive the intended quantity of medical solution. Thus, a key consideration in the design of films used to produce medical solution pouches is that the film must have sufficient flexibility that the resultant medical pouch is collapsible enough to be fully drainable.

Prior to administering a medical solution from a pouch and into a patient, a visual inspection of the solution contained within the pouch is performed by the medical professional who is performing the administration procedure. Such an inspection provides a cursory determination that the medical solution to be administered is of the proper type and has not deteriorated or become contaminated. In this regard, it is essential that the pouch have excellent optical properties, i.e., a high degree of clarity and transmission and a low degree of haze. A medical solution pouch having poor optical properties can easily render a visual inspection of the packaged solution ineffective, thereby causing the medical professional to needlessly discard the pouch. Worse, the medical professional could fail to notice a solution which is of the wrong type, or which had deteriorated or become contaminated. As will be discussed more fully below, the industry-wide practice of heat-sterilizing solution-containing medical pouches greatly exacerbates the problem of maintaining good optical properties in such pouches.

Heat-sterilization of solution-containing medical pouches typically occurs in an autoclave at about 250° F. for periods of 15 to 30 minutes. Steam is generally used as the heat-transfer medium. Heat-sterilization is normally performed by the manufacturer and/or packager of the medical solution prior to sending the packaged medical solution to the end user, e.g., a hospital. This helps to ensure that the medical solution, as packaged in the medical solution pouch, will be substantially free from contamination. Thus, another requirement of medical solution pouches is that they must be able to endure the high temperatures which are encountered during heat-sterilization without deterioration by, e.g., developing a heat-seal leak or other type of containment failure.

Medical solution pouches must also have sufficient mechanical strength to withstand the abuse which is typically encountered in the use environment. For example, in some circumstances, a plastic or rubber bladder is placed around a medical solution-containing pouch and pressurized to, e.g., 300–400 mm/Hg, in order to force the solution out of the pouch an into a patient. Such a bladder is commonly referred to as a "pressure-cuff" and is used, e.g., when a patient is bleeding profusely in order to quickly replace lost fluids or, e.g., when a patient has high blood pressure such that a greater opposing pressure must be generated in the pouch in order to introduce medical solution into the patient's veins. Medical solution pouches should have sufficient durability to remain leak-free during such procedures.

At present, flexible pouches for medical solution packaging are typically made from a highly plasticized polyvinyl chloride (PVC). While generally meeting the requirements mentioned above, PVC may have some undesirable properties for use as a medical solution pouch. For example, plasticizer can migrate from the PVC pouch and into the solution contained within the pouch so that the solution may become contaminated by potentially toxic material. A question has also arisen concerning whether PVC is adequately chemically neutral to medical solutions. It also been found that PVC becomes brittle at relatively low temperatures.

For these reasons, alternatives to PVC pouches have been sought. Such alternative pouches are typically formed from polyolefin-containing, multilayer films wherein one exterior layer of the film is an abuse-resistant layer and forms the outside of the pouch, while the other exterior layer of the film is a heat-seal layer, i.e., a layer able to seal to itself upon the application of sufficient heat, and forms the inside of the pouch. A core layer is generally provided as an interior layer in the film to impart strength and flexibility to the film, as well as to contribute to the gas impermeability of the film.

A particularly difficult challenge in the design and manufacture of polyolefin-based films which are used to produce medical solution pouches is the ability of the film to provide the above performance criteria after the pouch has been heat-sterilized. That is, the high temperatures and steam which are encountered during heat-sterilization can adversely affect the collapsibility, mechanical strength, and optical properties of the pouch.

Of particular concern is the adverse effect of heat-sterilization on the optical properties of medical solution pouches. In general, the gas permeability of polyolefin-based films is directly proportional to the temperature of such films. Thus, gas permeability increases with increasing temperature and vice versa. During heat-sterilization, the gas permeability of polyolefin-based medical solution pouches is significantly higher than when such pouches are at room temperature. As a result, the steam which is used to heat the pouches penetrates into the film from which the pouch has been formed. When the sterilization process is completed and the pouch is allowed to cool, some of the steam in the film often condenses and remains trapped inside the film, primarily in the core layer since it is generally the thickest layer of the film. The trapped condensate gives the pouch a hazy, cloudy appearance which can make it difficult to inspect the medical solution contained within the pouch as described above. In addition, the hazy appearance is aesthetically unappealing.

Accordingly, a need exists in the art for a multilayer, polyolefin-based film which is a suitable replacement for PVC as a material for the manufacture of medical solution pouches, and which has improved optical properties after the pouch has been heat-sterilized.

SUMMARY OF THE INVENTION

That need is met by the present invention which provides a multilayer film, comprising:

a) an interior layer comprising homogeneous ethylene/alpha-olefin copolymer having a density ranging from about 0.89 to about 0.92 grams per cubic centimeter;

b) a first exterior layer comprising a material selected from the group consisting of homopolymer or copolymer of polypropylene, a blend of homopolymer or copolymer of polypropylene and elastomer, high density polyethylene, and copolyester; and c) a second exterior layer comprising a material selected from the group consisting of polyamide, copolyamide, polyester, copolyester, high density polyethylene, polypropylene, propylene/ethylene copolymer, and polycarbonate.

Preferably, the homogeneous ethylene/alpha-olefin copolymer has a density ranging from about 0.90 to about 0.91 grams per cubic centimeter.

As an alternative, interior layer a) may comprise a blend of two or more homogeneous ethylene/alpha-olefin copolymers wherein the density of the blend ranges from about 0.89 to about 0.92 grams per cubic centimeter. Preferably, the blend has a density ranging from about 0.90 to about 0.91 grams per cubic centimeter.

Various embodiments of the multilayer film are possible. In one embodiment, the multilayer film is a three-layer film. In this event, the first and second exterior layers preferably comprise high density polyethylene and are adhered directly to the interior layer (i.e., without an intervening adhesive layer).

In another embodiment, the multilayer film is a four-layer film. In this instance, the film includes an additional layer, preferably an adhesive layer, which is positioned between and in adherence with the interior layer and the first exterior layer. The adhesive layer may comprise a material selected from the group consisting of ethylene/alpha-olefin copolymer having a density of less than or equal to 0.89 grams per cubic centimeter, a blend of homogeneous ethylene/alpha-olefin copolymer having a density ranging from about 0.89 to about 0.92 grams per cubic centimeter and the material from which the first exterior layer is formed, anhydride-modified ethylene/vinyl acetate copolymer, and anhydride-modified ethylene/methyl acrylate copolymer. When the multilayer film of the present invention is a four-layer structure, the first exterior layer preferably comprises a blend of homopolymer or copolymer of polypropylene and elastomer. The second exterior layer preferably comprises high density polyethylene and is adhered directly to the interior layer.

In yet another embodiment, the multilayer film of the present invention has a five-layer structure. In this instance, the film includes two additional layers. Preferably, the additional layers are adhesive layers. The first of the adhesive layers is positioned between and in adherence with the interior layer and the first exterior layer. This first adhesive layer may comprise a material selected from the group consisting of ethylene/alpha-olefin copolymer having a density of less than or equal to 0.89 grams per cubic centimeter, a blend of homogeneous ethylene/alpha-olefin copolymer having a density ranging from about 0.89 to about 0.92 grams per cubic centimeter and the material from which the first exterior layer is formed, anhydride-modified ethylene/vinyl acetate copolymer, and anhydride-modified ethylene/methyl acrylate copolymer.

The second of the adhesive layers is positioned between and in adherence with the interior layer and the second exterior layer. This second adhesive layer preferably comprises a material selected from the group consisting of anhydride-modified ethylene/vinyl acetate copolymer, anhydride-modified ethylene/methyl acrylate copolymer, anhydride-modified ethylene/ethyl acrylate copolymer, anhydride-modified linear low density polyethylene, anhydride-modified very low density polyethylene, and anhydride-modified high density polyethylene.

When the multilayer film of the present invention has a five-layer structure, the first exterior layer preferably comprises a blend of homopolymer or copolymer of polypropylene and elastomer. The second exterior layer preferably comprises copolyester or polyamide. In this instance, the first exterior layer may serve as a heat-seal layer while the second exterior layer serves as an abuse-resistant layer.

Another aspect of the present invention pertains to a pouch for the packaging and administration of medical solutions, wherein the pouch comprises any of the multilayer films described above.

When used to form medical solution pouches, the multilayer films of the present invention have been found to possess excellent optical properties (i.e., transmission, clarity, and haze) after the medical solution-containing pouches have been heat-sterilized as described above. Such post-sterilization optical properties are much better than previous polyolefin-based films. Specifically, the inventor has found that homogeneous ethylene/alpha-olefin copolymers are superior to heterogeneous ethylene/alpha-olefin copolymers (e.g., VLDPE), in terms of post-sterilization optical properties, when such copolymers are used to form the interior core layer in multilayer films which form heat-sterilizable medical solution pouches. For reasons which are not fully understood, homogeneous ethylene/alpha-olefin core layers were found to trap less steam condensate (i.e., water) after heat-sterilization than heterogeneous ethylene/alpha-olefin core layers. As a result, the transmission, clarity, and haze of heat-sterilized medical solution pouches formed from multilayer films having an interior core layer of a homogeneous ethylene/alpha-olefin copolymer are better than the transmission, clarity, and haze of heat-sterilized medical solution pouches formed from multilayer films having an interior core layer of a heterogeneous ethylene/alpha-olefin copolymer (e.g., VLDPE). Such improved optical properties are illustrated in the Examples below.

In addition to providing excellent optical properties, the multilayer films of the present invention exhibit all of the other performance criteria which are required in a medical solution pouch. That is, the multilayer films have good flexibility/collapsibility and mechanical strength, and are able to withstand high-temperature sterilization. In addition, the films provide good barrier properties. For these reasons, the inventive multilayer films are ideally suited for the packaging and administration of medical solutions. However, the films could also be used in any other application wherein a homogeneous ethylene/alpha-olefin core layer is employed.

DEFINITIONS

As used herein, the terms "film" and the like refer to a thermoplastic material, generally in sheet or web form, having one or more layers of polymeric materials which may be bonded together by any suitable means well known in the art.

As used herein, the terms "polymer," "polymeric," and the like, unless specifically defined, generally include homopolymers, copolymers, terpolymers, and blends and modifications thereof.

As used herein, the terms "elastomer" and the like refer to a material that, at room temperature, can be stretched repeatedly to at least twice its original length. This characteristic distinguishes plastics from elastomers and rubbers, as well as the fact that elastomers are given their final properties by mastication with fillers, processing aids, antioxidants, curing agents, etc., followed by vulcanization (curing) at elevated temperatures. However, a few elastomers are thermoplastic. Such thermoplastic elastomers include the following preferred materials: styrene-ethylene-butylene-styrene copolymer (SEBS), styrene-butadiene-styrene copolymer (SBS), styrene-isoprene-styrene copolymer (SIS), ethylene-propylene rubber (EPM), and ethylene-propylene-diene terpolymer (EPDM).

As used herein, the term "ethylene/alpha-olefin copolymer" generally designates copolymers of ethylene with one or more comonomers selected from $C_3$ to $C_{20}$ alpha-olefins, such as 1-butene, 1-pentene, 1-hexene, 1-octene, methyl pentene and the like, in which the polymer molecules comprise long chains with relatively few side chain branches. These polymers are obtained by low pressure polymerization processes and the side branching which is present will be short compared to non-linear polyethylenes (e.g., LDPE, a polyethylene homopolymer). Ethylene/alpha-olefin copolymers generally have a density in the range of from about 0.86 g/cc to about 0.94 g/cc, and can be said to fall into two general categories, heterogeneous and homogeneous, both of which are described below.

As used herein, the term "heterogeneous ethylene/alpha-olefin copolymer" refers to ethylene/alpha-olefin copolymerization reaction products of relatively wide variation in molecular weight and composition distribution, and which are prepared using conventional Ziegler-Natta or other heterogeneous catalysts. As is generally understood, "heterogeneous catalysts" are comprised of several kinds of active sites which differ in Lewis acidity and steric environment. Examples of Ziegler-Natta heterogeneous catalysts include metal halides activated by an organometallic co-catalyst, such as titanium chloride, optionally containing magnesium chloride, complexed to trialkyl aluminum, as is disclosed in patents such as U.S. Pat. Nos. 4,302,565 and 4,302,566.

In general, heterogeneous ethylene/alpha-olefins contain a relatively wide variety of chain lengths and comonomer percentages. Examples of heterogeneous ethylene/alpha-olefins include linear low density polyethylene (LLDPE), linear medium density polyethylene (LMDPE), very low density polyethylene (VLDPE), and ultra-low density polyethylene (ULDPE). LLDPE is generally understood to include that group of heterogeneous ethylene/alpha-olefin copolymers which fall into the density range of about 0.915 to about 0.94 g/cc. Sometimes linear polyethylene in the density range from about 0.926 to about 0.94 is referred to as LMDPE. Lower density heterogeneous ethylene/alpha-olefin copolymers are VLDPE (typically used to refer to the ethylene/butene copolymers available from Union Carbide with a density ranging from about 0.88 to about 0.91 g/cc) and ULDPE (typically used to refer to the ethylene/octene copolymers supplied by Dow).

As used herein, the phrase "homogeneous ethylene/alpha-olefin copolymer" refers to ethylene/alpha-olefin copolymerization reaction products of relatively narrow molecular weight distribution and relatively narrow composition distribution. Homogeneous ethylene/alpha-olefin copolymers are structurally different from heterogeneous ethylene/alpha-olefin copolymers, in that homogeneous ethylene/alpha-olefins exhibit a relatively even sequencing of comonomers within a chain, a mirroring of sequence distribution in all chains, and a similarity of length of all chains, i.e., a narrower molecular weight distribution. Furthermore, homogeneous ethylene/alpha-olefin copolymers are typically prepared using metallocene, or other single-site type catalysts, rather than using Ziegler Natta catalysts. Such single-site catalysts typically have only one type of catalytic site, which is believed to be the basis for the homgeniety of the polymers resulting from the polymerization.

More particularly, homogeneous ethylene/alpha-olefin copolymers may be characterized by one or more methods known to those of skill in the art, such as molecular weight distribution ($M_w/M_n$), composition distribution breadth index (CDBI), and narrow melting point range and single melt point behavior. The molecular weight distribution ($M_w/M_n$), also known as polydispersity, may be determined by gel permeation chromatography. Homogeneous ethylene/alpha-olefin copolymers generally have a ($M_w/M_n$) of less than 2.7; preferably from about 1.9 to 2.5; more preferably, from about 1.9 to 2.3. The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. CDBI determination clearly distinguishes the homogeneous copolymers used in the present invention (narrow composition distribution as assessed by CDBI values generally above 70%) from VLDPEs available commercially which generally have a broad composition distribution as assessed by CDBI values generally less than 55%. The CDBI of a copolymer is readily calculated from data obtained from techniques known in the art, such as, for example, temperature rising elution fractionation as described, for example, in Wild et. al., *J. Poly. Sci. Poly. Phys. Ed.*, Vol. 20, p.441 (1982). In general, the homogeneous ethylene/alpha-olefin copolymers in the multilayer films of the present invention also exhibit a relatively narrow melting point range, in comparison with "heterogeneous copolymers", i.e., polymers having a CDBI of less than 55%. Preferably, the homogeneous ethylene/alpha-olefin copolymers exhibit an essentially singular melting point characteristic, with a peak melting point ($T_m$), as determined by Differential Scanning Colorimetry (DSC), of from about 60° C. to about 1 10° C. As used herein, the phrase "essentially single melting point" means that at least about 80%, by weight, of the material corresponds to a single $T_m$ peak at a temperature within the range of from about 60° C. to about 110° C., and essentially no substantial fraction of the material has a peak melting point in excess of about 115° C., as determined by DSC analysis. DSC measurements can be made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min. The presence of higher melting peaks is detrimental to film properties such as haze.

A homogeneous ethylene/alpha-olefin copolymer can, in general, be prepared by the copolymerization of ethylene and any one or more alpha-olefin. Preferably, the alpha-olefin is a $C_3$–$C_{20}$ alpha-monoolefin, more preferably, a $C_4$–$C_{12}$ alpha-monoolefin, still more preferably, a $C_4$–$C_8$ alpha-monoolefin. Still more preferably, the alpha-olefin comprises at least one member selected from the group consisting of 1-butene, 1-pentene, 1-hexene, and 1-octene. Processes for preparing and using homogeneous polymers are disclosed in U.S. Pat. Nos. 5,206,075, 5,241,031, 5,272,236, and 5,278,272; and in PCT International Publication Nos. WO 90/03414 and 93/03093, all of which are hereby incorporated by reference herein in their respective entireties.

Commercially-available examples of homogeneous ethylene/alpha-olefin copolymers include metallocene-catalyzed EXAC™ linear homogeneous ethylene/alpha-olefin copolymer resins obtainable from the Exxon Chemical Company, of Baytown, Tex.; TAFMER™ linear homogeneous ethylene/alpha-olefin copolymer resins obtainable from the Mitsui Petrochemical Corporation; and long-chain branched, metallocene-catalyzed homogeneous ethylene/alpha-olefin copolymers available from The Dow Chemical Company, known as AFFINITY™ resins.

As used herein, the term "olefin" generally refers to any one of a class of monounsaturated, aliphatic hydrocarbons of the general formula $C_nH_{2n}$, such as ethylene, propylene, and butene. The term may also include aliphatics containing more than one double bond in the molecule such as a diolefin or diene, e.g., butadiene.

As used herein, the term "polyolefin" refers to olefin polymers and copolymers, especially ethylene and propylene polymers and copolymers, and to polymeric materials having at least one olefinic comonomer, such as ethylene vinyl acetate copolymer and ionomer. Polyolefins can be linear, branched, cyclic, aliphatic, aromatic, substituted, or unsubstituted. Included in the term polyolefin are homopolymers of olefin, copolymers of olefin, copolymers of an olefin and a non-olefinic comonomer copolymerizable with the olefin, such as vinyl monomers, modified polymers of the foregoing, and the like. Modified polyolefins include modified polymers prepared by copolymerizing the homopolymer of the olefin or copolymer thereof with an unsaturated carboxylic acid, e.g., maleic acid, fumaric acid or the like, or a derivative thereof such as the anhydride, ester metal salt or the like. It could also be obtained by incorporating into the olefin homopolymer or copolymer, an unsaturated carboxylic acid, e.g., maleic acid, fumaric acid or the like, or a derivative thereof such as the anhydride, ester metal salt or the like.

As used herein, the phrase "interior layer" refers to any layer of a multilayer film having both of its principal surfaces directly adhered to another layer of the film.

As used herein, the phrase "exterior layer" refers to any layer of a multilayer film having only one of its principal surfaces directly adhered to another layer of the film. In the multilayer films of the present invention, there are two exterior layers, each of which has a principal surface adhered to only one other layer of the multilayer film. The other principal surface of each of the two exterior layers form the two principal outer surfaces of the multilayer film.

As used herein, the term "adhesive layer" refers to any interior layer having the primary purpose of adhering two layers to one another.

DETAILED DESCRIPTION OF THE PREFERRED EMBODIMENT

Figure 1:
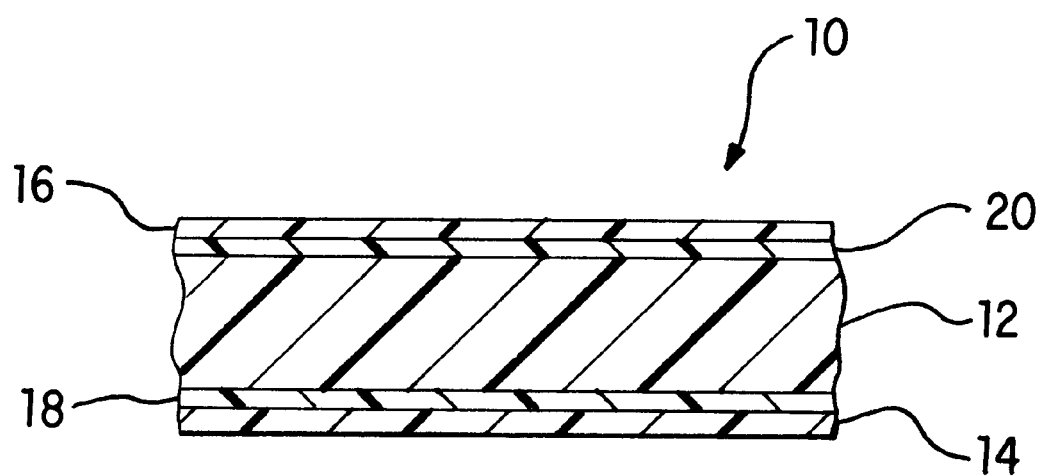
FIG. 1 is a schematic cross-section of a five-layer film in accordance with the present invention.

FIG. 1 shows a multilayer film 10 in accordance with the present invention which has a preferred five-layer structure for forming flexible pouches with which to package and administer medical solutions. Examples of medical solutions which are packaged and administered in this manner include saline solutions, dextrose solutions, and solutions for dialysis applications. Multilayer film 10 includes an interior core layer 12, a first exterior layer 14, a second exterior layer 16, a first adhesive layer 18 positioned between and in adherence with interior layer 12 and first exterior layer 14, and a second adhesive layer 20 positioned between and in adherence with interior layer 12 and second exterior layer 16.

Multilayer film 10 preferably has a total thickness ranging from about 3 to 14 mils (1 mil=0.001 inch=0.0254 mm), preferably 5 to 10 mils, and most preferably 6.5 to 9.5 mils. Exterior layers 14 and 16 may range in thickness from about 0.5 to about 8 mils, but preferably are about 0.75 mil in thickness. Adhesive layers 18 and 20 may range in thickness from about 0.1 to about 0.75 mil, but preferably are about 0.4 mil in thickness. Interior layer 12 may range in thickness from about 1 to about 9 mils, but preferably is about 5.2 mils in thickness.

As shown in FIG. 1 and described immediately above, it is preferred that interior layer 12 be relatively thick in comparison to the other layers of film 10. Such relative thickness generally facilitates layer 12 in carrying out its primary functions of imparting flexibility, strength, and barrier properties to multilayer film 10. A layer which provides such functions is often referred to as a "core" layer.

Being the thickest layer in multilayer film 10, interior layer 12 generally has the greatest impact on the optical properties of a medical solution pouch made from film 10 after that pouch has been heat-sterilized. Thus, the unexpected discovery that a homogeneous ethylene/alpha-olefin copolymer traps less steam condensate after heat-sterilization than a heterogeneous ethylene/alpha-olefin is particularly significant. This property alone, however, is not enough to qualify a material as suitable for use as a core layer in a multilayer film used to make medical solution pouches. The material should also 1) have a sufficiently high melting point that the film remains intact during the heat-sterilization process; 2) provide adequate barrier properties, especially to oxygen and water vapor; 3) be processable (e.g., coextrudable) with the other layers of the film; and 4) impart sufficient flexibility to the film that a medical solution pouch made therefrom can drain properly. The inventor has determined that if the homogeneous ethylene/alpha-olefin copolymer, or blend of ethylene/alpha-olefin copolymers, of layer 12 has a density ranging from about 0.89 to about 0.92 grams per cubic centimeter, the copolymer is capable of providing each of the foregoing properties (in addition to excellent optical properties due to a lessened tendency to trap steam condensate). Specifically, while homogeneous ethylene/alpha-olefin copolymers, or blends thereof, with densities below about 0.89 g/cc may be operable, such copolymers are not likely to have a combination of sufficient heat-resistance to withstand heat-sterilization, adequate gas impermeability, and satisfactory melt strength to be coextrudable with the other layers of the film. Similarly, if the density of the homogeneous ethylene/alpha-olefin copolymer, or blend of copolymers, is greater than about 0.92 g/cc, the resultant medical solution pouch may be too stiff to drain properly and may not provide the excellent optical properties after heat-sterilization which have otherwise been found to exist with homogeneous ethylene/alpha-olefins. A more preferred density range for the homogeneous ethylene/alpha-olefin copolymer or blend of copolymers is 0.90 to about 0.91 g/cc.

Preferably, the melt-flow index (ASTM D-1238) of the homogeneous ethylene/alpha-olefin copolymer or blend of copolymers is less than 20, more preferably less than 10, even more preferably less than 2.2 and most preferably, between 0.1 and 1.5. Exemplary homogeneous ethylene/alpha-olefin copolymers include the following from the Exxon Chemical Company: EXACT™ 3029 with a melt index of approximately 1.2 dg/min (ASTM D-1238(E)), a density of approximately 0.91 g/cc (ASTM D-792), and a DSC peak melting point of approximately 107° C. (Exxon method); EXACT™ 3025 with a melt index of approximately 1.2 dg/min (ASTM D-1238(E)), a density of approximately 0.91 g/cc (ASTM D-792), and a DSC peak melting point of approximately 103° C. (Exxon method); EXACT™ 3028 with a melt index of approximately 1.2 dg/min (ASTM D-1238(E)), a density of approximately 0.90 g/cc (ASTM D-792), and a DSC peak melting point of approximately 92° C. (Exxon method); and EXACT™ 4011 with a melt index of approximately 2.2 dg/min (ASTM D-1238(E)), a density of approximately 0.89 g/cc (ASTM D-1505), and a DSC peak melting point of approximately 70° C. (Exxon method). Other suitable homogeneous ethylene/alpha-olefin copolymers include AFFINITY™ resins from the Dow Chemical Co., such as PL 1880 with a density of approximately 0.90 g/cc and melt index of approximately 1.0; PL 1840 with a density of approximately 0.91 g/cc and melt index of approximately 1.0; PL 1845 with a density of approximately 0.91 g/cc and melt index of approximately 3.5; and FM 1570 with a density of approximately 0.915 g/cc and melt index of approximately 1.0.

First exterior layer 14 preferably serves as a heat-seal layer. In this manner, when multilayer film 10 is formed into a medical solution pouch, first exterior layer 14 will form the inside surface of the pouch, i.e., the surface which is in contact with the packaged medical solution. In addition, layer 14 forms a heat-seal when the film 10 is folded upon itself or mated with another film such that two regions of layer 14 are brought into contact with one another and sufficient heat is applied to predetermined segments of the contacting regions of layer 14 that the heated segments become molten and intermix with one another. Upon cooling, the heated segments of layer 14 become a single, essentially inseparable layer. In this manner, the heated segments of layer 14 produce a liquid-tight closure which is commonly referred to as a heat-seal. The heat-seals thus formed are generally fin-shaped and are linked together to define the peripheral boundaries of the pouch so that a medical solution can be fully enclosed therein.

First exterior layer 14 comprises a material selected from the group consisting of a homopolymer or copolymer of polypropylene, a blend of homopolymer or copolymer of polypropylene and elastomer, high density polyethylene, and copolyester. Of the foregoing materials, layer 14 preferably comprises a blend of homopolymer or copolymer of polypropylene and elastomer. The polyproplylene imparts good heat-resistance to layer 14 while the elastomer provides creep- and impact-resistance thereto. When the elastomer is blended with polypropylene such that the weight percentage of elastomer ranges from about 5 to about 50 (based on the total weight of layer 14), excellent heat-seals can be produced. The best heat-seals are obtained when the elastomer is present at a weight percentage ranging from about 10 to 40 and, most preferably, from about 10 to 30.

Such heat-seals are consistently able to withstand all of the severe conditions typically encountered by medical solution pouches, i.e., heat-sterilization, pressure-cuff application, and general rough handling.

The homopolymer or copolymer of polypropylene is preferably propylene/ethylene copolymer having from about 2 to about 10 percent by weight ethylene and, more preferably, from about 4 to about 6 percent ethylene. A suitable propylene/ethylene copolymer is commercially available from the Fina Oil & Chemical Company under the tradename Z9450, and has an ethylene content of about 6 weight percent. Other commercially available propylene/ethylene copolymers include, e.g., PLTD 665 from Exxon. The polypropylene used in layer 14 may be of any of the available types, i.e., isotactic, syndiotactic, and, less preferably, atactic.

The elastomer may be selected from the group consisting of styrene-ethylene-butylene-styrene block copolymer (SEBS), styrene-butadiene-styrene block copolymer (SBS), styrene-isoprene-styrene block copolymer (SIS), ethylene-propylene rubber (EPM), and ethylene-propylene-diene terpolymer (EPDM). SEBS is commercially available, e.g., from the Shell Chemical Co. as Kraton G-1650, G-1652, and G-1657X. SBS is commercially available, e.g., from Shell as Kraton D-1101, D-1102, D-1300C, D-4122, D-4141, D-4455X, and D-4460X. SIS is commercially available, e.g., from Shell as Kraton D-1107, D-1111, D-1112, and D-1117. EPM is commercially available, e.g., from Exxon as Vistalon 719 or 503. EPDM is commercially available, e.g., from Exxon as Vistalon 3708.

Suitable, pre-prepared blends of polypropylene and elastomer are also commercially available. For example, Z-4650 from Horizon Polymers is a blend of 80 percent by weight Z9450 (propylene/ethylene copolymer as described above) and 20 percent by weight Kraton G-1652 (SEBS as described above). The other materials from which layer 14 can be formed are all widely and commercially available.

When multilayer film 10 is formed into a medical solution pouch, second exterior layer 16 forms the outside surface of the pouch. As such, the primary functions of exterior layer 16 are to provide heat-resistance to the pouch during heat-sealing and heat-sterilization, and to provide abuse-resistance from external handling and abrasion. Layer 16 preferably comprises a material selected from the group consisting of polyamide, copolyamide, polyester, copolyester, high density polyethylene, polypropylene, propylene/ethylene copolymer, and polycarbonate.

Suitable polyamides and copolyamides include nylon 66, nylon 610, nylon 12 and copolymers thereof, nylon 11 and copolymers thereof, amorphous nylon, and blends of the foregoing polyamides. A preferred copolyamide is nylon 66/610. Such a material is commercially available from EMS-American Gricon, Inc. under the designation XE 3303. Suitable copolyesters are commercially available from Eastman Chemical Products, Inc. under the tradenames ECDEL™ 9965, 9966, and 9967. Each of the other materials from which second exterior layer 16 can be formed are widely and commercially available.

First adhesive layer 18 preferably comprises a material selected from the group consisting of ethylene/alpha-olefin copolymer having a density of less than or equal to 0.89 grams per cubic centimeter, a blend of homogeneous ethylene/alpha-olefin copolymer having a density ranging from about 0.89 to about 0.92 grams per cubic centimeter and the material from which first exterior layer 14 is formed, anhydride-modified ethylene/vinyl acetate copolymer, and anhydride-modified ethylene/methyl acrylate copolymer.

Each of the foregoing materials is compatible with the material from which interior layer 12 is formed (i.e., homogeneous ethylene/alpha-olefin copolymer). Thus, the particular material which is selected for adhesive layer 18 will depend upon the composition of first exterior layer 14. For example, when layer 14 comprises a blend of homopolymer or copolymer of polypropylene (e.g., propylene/ethylene copolymer) and elastomer (e.g., SEBS), first adhesive layer 18 preferably comprises ethylene/alpha-olefin copolymer having a density of less than or equal to 0.89 grams per cubic centimeter. More preferably, the density is less than or equal to 0.88 g/cc. Such a material has been found to adhere very well to layers 12 and 14 and, as a result, is believed to provide improved pressure-cuff performance for medical solution pouches made from such films.

The most widely available ethylene/alpha-olefin copolymers with densities of 0.89 g/cc or less are those which are homogeneous, e.g., metallocene-catalyzed. Such copolymers are commercially available from resin manufacturers such as The Dow Chemical Company and the Exxon Chemical Company. Exemplary ethylene/alpha-olefin copolymers with densities of 0.89 g/cc or less include ENGAGE™ EG 8150, an ethylene/octene copolymer commercially available from Dow and having a density of 0.868 g/cc (ASTM D-792), a melt index of 0.5 dg/min. (ASTM D-1238), and 25% octene (ASTM D-2238, Method B); ENGAGE™ EG 8100, an ethylene/octene copolymer having a density of 0.87 g/cc (ASTM D-792), a melt index of 1 dg/min. (ASTM D-1238), and 24% octene (ASTM D-2238, Method B); and ENGAGE™ EG 8200, an ethylene/octene copolymer having a density of 0.87 g/cc (ASTM D-792), a melt index of 5 dg/min. (ASTM D-1238), and 24% octene (ASTM D-2238, Method B).

Second adhesive layer 20 preferably comprises a material selected from the group consisting of anhydride-modified ethylene/vinyl acetate copolymer, anhydride-modified ethylene/methyl acrylate copolymer, anhydride-modified ethylene/ethyl acrylate copolymer, anhydride-modified linear low density polyethylene, anhydride-modified very low density polyethylene, and anhydride-modified high density polyethylene.

Each of the foregoing materials is compatible with interior layer 12. Thus, the particular choice of material for adhesive layer 20 will depend upon the material selected for second exterior layer 16. For example, when layer 16 comprises copolyester, adhesive layer 20 preferably comprises anhydride-modified ethylene/methyl acrylate copolymer. Suitable anhydride-modified ethylene/methyl acrylate copolymers are commercially available from DuPont under the tradenames BYNEL™ CXA E369 and BYNEL™ CXA E374, and from Quantum Chemicals under the tradename PLEXAR™ 3382. Anhydride-modified linear low density polyethylene is commercially available from Mitsui under the tradenames ADMER™ NF 500 and NF 550, and from DuPont under the tradename BYNEL™ 4134. Each of the other materials which can be used for adhesive layers 18 and 20 are also commercially available.

As can be appreciated by those having ordinary skill in this art, the multilayer films of the present invention are not limited to the five-layer structure described above. Films having a fewer number of layers than that shown, e.g., the three and four layer structures described earlier herein, are included within the scope of the present invention. In addition, films having a greater number of layers than that shown in FIG. 1 are also included within the scope of the present invention. That is, additional layers could be added to the structure shown in FIG. 1 in order to provide additional desired properties to the film. For example, additional high density polyethylene layer(s) may be included in the film in order to increase the moisture barrier capabilities of the film if such an increase is desired. Additional oxygen barrier layer(s) may also be included if desired.

Various additives may used in any or all of the layers of the multilayer film of the present invention. Such additives include, without limitation, antiblocking agents, antioxidants, processing aids such as calcium stearate, pigments, antistatic agents, etc. Where the multilayer film is to be used to for making medical solution pouches, the amount of additive included in the film is preferably kept to a minimum in order to minimize the liklihood that such additives will be extracted into the medical solution during heat-sterilization.

The multilayer films of the present invention are preferably formed by cast coextrusion as a tubular film. Containers for medical applications or other end uses can be made directly from the coextruded, tubular film, or alternatively from rollstock material obtained from the tube after it has been slit and ply-separated. A hot blown process can also be used to make the film, although the optical properties of the resulting pouch would likely be inferior to those from a cast coextrusion process. Other processes, such as extrusion coating, conventional lamination, slot die extrusion, etc., can also be used to make the multilayer film of the present invention, although these alternative processes can be more difficult or less efficient than the preferred method.

Multilayer films in accordance with the present invention are preferably cross-linked. Cross-linking increases the structural strength of the film at elevated temperatures and/or increases the force at which the material can be stretched before tearing apart. Cross-linking is preferably done by irradiation, i.e., bombarding the film with particulate or non-particulate radiation such as high-energy electrons from an accelerator or cobalt-60 gamma rays, to cross-link the materials of the film. A preferred irradiation dosage level is in the range of from about 2 megarads (M.R.) to about 8 M.R. Any conventional cross-linking technique may be used. For example, electronic cross-linking may be carried out by curtain-beam irradiation. Chemical cross-linking techniques may also be employed, e.g., by the use of peroxides.

Pouches made by the multilayer films of the present invention may be sealed by various means well known in the art, including impulse and hot-bar sealing. An example of a commercially available impulse-type sealing device is a Vertrod™ heat sealer. The heat-seals which form the top and bottom of the pouch (generally shorter in length than the sides of the pouch) are preferably formed in the machine direction of the multilayer film (i.e., the direction in which the film moved through the production equipment), verses the transverse direction (which is perpendicular to the machine direction).

The multilayer films of the present invention have been described in connection with a pouch for the packaging of medical solutions. However, it is to be understood that other applications for the films are also possible, and that this disclosure should not be construed as being limited only to medical solution pouches.

The invention may be further understood by reference to the following examples, which are provided for the purpose of representation, and are not to be construed as limiting the scope of the invention.

EXAMPLES

All of the films used in the examples were cast coextruded and cross-linked by high-energy electron radiation. Each of the films had the five-layer structure shown in FIG. 1 and had a total thickness of approximately 7.5 mils. The exterior layers 14 and 16 each had a thickness of about 0.75 mil, adhesive layers 18 and 20 each had a thickness of about 0.4 mil, and interior layer 12 had a thickness of approximately 5.6 mils.

The materials used in the examples are identified below. All percentages are weight percents unless indicated otherwise. All physical property and compositional values are approximate unless indicated otherwise.

"EPC-1": Z9450 (™); a propylene/ethylene copolymer having an ethylene content of about 6 weight percent and a density of about 0.89 g/cc (ASTM D-1505); obtained from the Fina Oil & Chemical Company of Dallas, Tex.

"SEBS": Kraton G-1652 (™); a styrene-ethylene-butylene-styrene block copolymer having a tensile strength of about 4500 psi (ASTM D412), a 300% modulus of about 700 psi (ASTM D412), an elongation of about 500% (ASTM D412), a Shore A hardness of about 75, and a specific gravity of about 0.91; obtained from the Shell Chemical Co. of Houston, Tex.

"EAO-1": ENGAGE EG 8100 (™); an ethylene/octene copolymer (believed to be homogeneous) having a density of about 0.87 g/cc (ASTM D-792), a melt index of about 1 dg/min. (ASTM D-1238), and about 24% octene (ASTM D-2238, Method B); obtained from The Dow Chemical Company, Midland, Mich.

"EAO-2": EXACT™ 3025; a homogeneous ethylene/alpha-olefin copolymer with a melt index of approximately 1.2 dg/min (ASTM D-1238(E)), a density of approximately 0.91 g/cc (ASTM D-792), and a DSC peak melting point of approximately 103° C.; obtained from the Exxon Chemical Co.

"EAO-3": EXACT™ 3028; a homogeneous ethylene/alpha-olefin copolymer with a melt index of approximately 1.2 dg/min (ASTM D-1238(E)), a density of approximately 0.90 g/cc (ASTM D-792), and a DSC peak melting point of approximately 92° C.; obtained from the Exxon Chemical Co.

"EAO-4": EXACT™ 4011; a homogeneous ethylene/alpha-olefin copolymer with a melt index of approximately 2.2 dg/min (ASTM D-1238(E)), a density of approximately 0.89 g/cc (ASTM D-1505), and a DSC peak melting point of approximately 70° C.; obtained from the Exxon Chemical Co.

"VLDPE": DEFD 1362 (™); a very low density polyethylene having a density of about 0.906 g/cc and a melt index of about 0.9; obtained from Union Carbide Chemicals and Plastics Company, Inc., Fort Lavaga, Tex.

"EMA": BYNEL CXA E374 (™); an anhydride-modified ethylene/methyl acrylate copolymer having a melt index of about 2.8 dg/min (ASTM D1238, 190/2.16) and a density of about 0.931 g/cc (ASTM 1505); obtained from E. I. DuPont de Nemours of Wilmington, Del.

"CPE": ECDEL 9965 (™); a copolyester ether having a flow rate of about 15 grams/10 minutes (ASTM D 1238, 230/2.16) and a specific gravity of about 1.13 (ASTM D 792); obtained from Eastman Chemical Products, Inc., Kingsport, Tenn.

Example 1

A multilayer film in accordance with the present invention had the following five-layer structure:

First exterior (heat-seal) layer 14: 80% EPC-1+20% SEBS

First adhesive layer 18: EAO-1

Interior (core) layer 12: 33% EAO-2, 33% EAO-3, 33% EAO-4

Second adhesive layer 20: EMA

Second exterior (abuse-resistant) layer 16: CPE

Example 2

A multilayer film in accordance with the present invention had the same structure as in Example 1 except the interior (core) layer comprised EAO-3 alone (i.e., was not blended with EAO-2 or EAO-4).

Example 3

A multilayer film in accordance with the present invention had the same structure as in Example 1 except the interior (core) layer comprised EAO-2 alone (i.e., was not blended with EAO-3 or EAO-4).

Example 4 (Comparative)

A comparative multilayer film had the same structure as in Example 1 except the interior (core) layer comprised VLDPE and the first adhesive layer comprised 50% core layer material (VLDPE)+50% heat-seal material (80% EPC+20% SEBS).

Example 5

Prior to the formation of medical solution pouches and heat-sterilization, films from Examples 1–4 were tested for the optical properties haze and total transmission. The haze and total transmission tests were conducted in accordance with ASTM D 1003—Method A. A total of four samples were tested for each film. The results for each of the four samples were averaged and are shown in Table 1 below.

TABLE 1

| FILM | HAZE (%) | TOTAL TRANSMISSION (%) |
| --- | --- | --- |
| Example 1 | 4.6 | 94 |
| Example 2 | 3.8 | 94 |
| Example 3 | 4.0 | 94 |
| Example 4 (Comparative) | 5.5 | 93 |

As shown, the optical properties of haze and total transmission were similar for each of the four films prior to heat-sterilization, with the films of Examples 1–3 being slightly better than the film of Comparative Example 4.

Example 6

In order to determine the effects of heat-sterilization on the optical properties of the films of Examples 1–4, the films from Examples 1–4 were formed into 2-liter-capacity medical solution pouches. A Vertrod™ impulse heat-sealer was used to form fin-type heat-seals at the periphery of each pouch. The pouches were then filled with water through an opening at the top of the pouch. The opening was then heat-sealed with the Vertrod™ impulse heat-sealer so that the water was completely enclosed within each pouch. Four such pouches were made for each of the films of Examples 1–4.

Each water-containing pouch was then heat-sterilized in an autoclave at 250° F. for 30 minutes, and were then allowed to cool at room temperature for 24 hours. The water was then removed from the pouches and the pouches were allowed to dry. Thereafter, the pouches were tested for the optical properties total transmission, haze, clarity, and gloss. Total transmission and haze were determined in accordance with ASTM D 1003—Method A, as above in Example 5. Clarity was determined in accordance with ASTM D 1746 and gloss was determined in accordance with ASTM D2457. The optical properties shown in Table 2 below are averages for each of the four pouches made from each of the films of Examples 1–4.

TABLE 2

| FILM | TOTAL TRANSMISSION (%) | HAZE (%) | CLARITY (%) | GLOSS (45°) |
|---|---|---|---|---|
| EX. 1 | 93.1 | 6.4 | 11.1 | 80 |
| EX. 2 | 93.2 | 6.4 | 13.0 | 77 |
| EX. 3 | 92.5 | 7.8 | 13.3 | 78 |
| EX. 4 (COMP.) | 91.8 | 33.8 | 5.9 | 62 |

As shown, the pouches made from the films of Examples 1–3 (i.e., films in accordance with the present invention having a homogeneous ethylene/alpha-olefin copolymer in the interior (core) layer) had better optical properties after heat-sterilization in all four categories of tests (total transmission, haze, clarity, and gloss) than pouches made from a comparative film having a heterogeneous ethylene/alpha-olefin copolymer (i.e., VLDPE) in the core layer. Such improvements were not predictable from the pre-sterilization results of Example 5, which showed much closer optical properties for the films of Examples 1–4. The improvements in haze and clarity of the films of Examples 1–3 over the film of comparative Example 4 are particularly dramatic. Also noteworthy is the extent to which the haze value for the film of comparative Example 4 worsened after being heat-sterilized (Table 2) verses the haze value of that film before heat-sterilization (Table 1). As shown, the films of Examples 1–3 fared much better.

The improvement in gloss of the films of Examples 1–3 over the film of comparative Example 4 is beneficial in that medical solution pouches with higher gloss are more aesthetically appealing than pouches with lower gloss.

To simulate a pouch containing a medical solution, mineral oil was coated on the heat-seal side of the above heat-sterilized pouches and the optical properties of such coated samples were measured as before. This had no major effect on the optical property values reported in Table 2 (i.e., the films of the present invention still exhibited superior optical properties over the comparative film), except for clarity. The mineral oil decreased the clarity of each sample (verses the corresponding non-oiled sample) and had the effect of narrowing the improvement in clarity of the films of Examples 1–3 over the film of Comparative Example 4. It is not known why this occurred but is believed to have resulted from an inconsistent or uneven application of the mineral oil to the pouches during testing.

Example 7

Each of the films of Examples 1–4 were tested for yield, tensile strength at break, elongation at break, modulus, pressure-cuff performance, and permeability to oxygen, moisture, and carbon dioxide. The tests were in accordance with standard ASTM methods. As compared to the comparative film of Example 4, the films of Examples 1–3 had somewhat higher tensile strengths; similar behavior in yield, elongation, and modulus; better pressure-cuff performance (i.e., water-filled pouches made therefrom lasted longer in a pressure-cuff before experiencing a heat-seal leak); and had somewhat poorer gas barrier performance (but were still within acceptable limits for use as a medical solution pouch). This Example is cited to illustrate that the films of the present invention not only exhibit better optical properties after pouches made therefrom have been heat-sterilized, but also possess other physical properties which are necessary for such films to be used as medical solution pouches.

While the invention has been described with reference to illustrative examples, those skilled in the art will understand that various modifications may be made to the invention as described without departing from the scope of the claims which follow.

What is claimed is:

1. A multilayer film, comprising:

a) an interior layer comprising homogeneous ethylene/alpha-olefin copolymer having a density ranging from about 0.89 to about 0.92 grams per cubic centimeter;

b) a first exterior layer comprising a material selected from the group consisting of a homopolymer or copolymer of polypropylene, a blend of homopolymer or copolymer of polypropylene and elastomer, high density polyethylene, and copolyester;

c) a first adhesive layer positioned between said interior layer and said first exterior layer;

d) a second exterior layer comprising a material selected from the group consisting of polyamide, copolyamide, polyester, copolyester, high density polyethylene, polypropylene, propylene/ethylene copolymer, and polycarbonate; and e) a second adhesive layer positioned between said interior layer and said second exterior layer.

2. The multilayer film of claim 1, wherein said homogeneous ethylene/alpha-olefin copolymer has a density ranging from about 0.90 to about 0.91 grams per cubic centimeter.

3. The multilayer film of claim 1, wherein said first adhesive layer comprises a material selected from the group consisting of ethylene/alpha-olefin copolymer having a density of less than or equal to 0.89 grams per cubic centimeter, a blend of homogeneous ethylene/alpha-olefin copolymer having a density ranging from about 0.89 to about 0.92 grams per cubic centimeter and the material from which said first exterior layer is formed, anhydride-modified ethylene/vinyl acetate copolymer, and anhydride-modified ethylene/methyl acrylate copolymer.

4. The multilayer film of claim 3, wherein said first exterior layer comprises a blend of homopolymer or copolymer of polypropylene and elastomer, and said second exterior layer comprises high density polyethylene.

5. The multilayer film of claim 1, wherein:

a) said first adhesive layer comprises a material selected from the group consisting of ethylene/alpha-olefin copolymer having a density of less than or equal to 0.89 grams per cubic centimeter, a blend of homogeneous ethylene/alpha-olefin copolymer having a density ranging from about 0.89 to about 0.92 grams per cubic centimeter and the material from which said first exterior layer is formed, anhydride-modified ethylene/vinyl acetate copolymer, and anhydride-modified ethylene/methyl acrylate copolymer; and b) said second adhesive layer comprises a material selected from the group consisting of anhydride-modified ethylene/vinyl acetate copolymer, anhydride-modified ethylene/methyl acrylate copolymer, anhydride-modified ethylene/ethyl acrylate copolymer, anhydride-modified linear low density polyethylene, anhydride-modified very low density polyethylene, and anhydride-modified high density polyethylene.

6. The multilayer film of claim 5, wherein said first exterior layer comprises a blend of homopolymer or copolymer of polypropylene and elastomer, and said second exterior layer comprises copolyester or polyamide.

7. A multilayer film, comprising:

a) an interior layer comprising a blend of two or more homogeneous ethylene/alpha-olefin copolymers wherein the density of said blend ranges from about 0.89 to about 0.92 grams per cubic centimeter;

b) a first exterior layer comprising a material selected from the group consisting of a homopolymer or copolymer of polypropylene, a blend of homopolymer or copolymer of polypropylene and elastomer, high density polyethylene, and copolyester;

c) a first adhesive layer positioned between said interior layer and said first exterior layer;

d) a second exterior layer comprising a material selected from the group consisting of polyamide, copolyamide, polyester, copolyester, high density polyethylene, polypropylene, propylene/ethylene copolymer, and polycarbonate; and e) a second adhesive layer positioned between said interior layer and said second exterior layer.

8. The multilayer film of claim 7, wherein said blend of two or more homogeneous ethylene/alpha-olefin copolymers has a density ranging from about 0.90 to about 0.91 grams per cubic centimeter.

9. The multilayer film of claim 7, wherein said first adhesive layer comprises a material selected from the group consisting of ethylene/alpha-olefin copolymer having a density of less than or equal to 0.89 grams per cubic centimeter, a blend of homogeneous ethylene/alpha-olefin copolymer having a density ranging from about 0.89 to about 0.92 grams per cubic centimeter and the material from which said first exterior layer is formed, anhydride-modified ethylene/vinyl acetate copolymer, and anhydride-modified ethylene/methyl acrylate copolymer.

10. The multilayer film of claim 9, wherein said first exterior layer comprises a blend of homopolymer or copolymer of polypropylene and elastomer, and said second exterior layer comprises high density polyethylene.

11. The multilayer film of claim 7, wherein:

a) said first adhesive layer comprises a material selected from the group consisting of ethylene/alpha-olefin copolymer having a density of less than or equal to 0.89 grams per cubic centimeter, a blend of homogeneous ethylene/alpha-olefin copolymer having a density ranging from about 0.89 to about 0.92 grams per cubic centimeter and the material from which said first exterior layer is formed, anhydride-modified ethylene/vinyl acetate copolymer, and anhydride-modified ethylene/methyl acrylate copolymer; and b) said second adhesive layer comprises a material selected from the group consisting of anhydride-modified ethylene/vinyl acetate copolymer, anhydride-modified ethylene/methyl acrylate copolymer, anhydride-modified ethylene/ethyl acrylate copolymer, anhydride-modified linear low density polyethylene, anhydride-modified very low density polyethylene, and anhydride-modified high density polyethylene.

12. The multilayer film of claim 11, wherein said first exterior layer comprises a blend of homopolymer or copolymer of polypropylene and elastomer, and said second exterior layer comprises copolyester or polyamide.

13. A pouch for the packaging and administration of medical solutions, said pouch comprising a multilayer film which comprises:

a) an interior layer comprising homogeneous ethylene/alpha-olefin copolymer having a density ranging from about 0.89 to about 0.92 grams per cubic centimeter;

b) a first exterior layer comprising a material selected from the group consisting of a homopolymer or copolymer of polypropylene, a blend of homopolymer or copolymer of polypropylene and elastomer, high density polyethylene, and copolyester;

c) a first adhesive layer positioned between said interior layer and said first exterior layer;

d) a second exterior layer comprising a material selected from the group consisting of polyamide, copolyamide, polyester, copolyester, high density polyethylene, polypropylene, propylene/ethylene copolymer, and polycarbonate; and e) a second adhesive layer positioned between said interior layer and said second exterior layer.

14. The pouch of claim 13, wherein said homogeneous ethylene/alpha-olefin copolymer has a density ranging from about 0.90 to about 0.91 grams per cubic centimeter.

15. The pouch of claim 13, wherein said first adhesive layer comprises a material selected from the group consisting of ethylene/alpha-olefin copolymer having a density of less than or equal to 0.89 grams per cubic centimeter, a blend of homogeneous ethylene/alpha-olefin copolymer having a density ranging from about 0.89 to about 0.92 grams per cubic centimeter and the material from which said first exterior layer is formed, anhydride-modified ethylene/vinyl acetate copolymer, and anhydride-modified ethylene/methyl acrylate copolymer.

16. The pouch of claim 15, wherein said first exterior layer comprises a blend of homopolymer or copolymer of polypropylene and elastomer, and said second exterior layer comprises high density polyethylene.

17. The pouch of claim 13, wherein:

a) said first adhesive layer comprises a material selected from the group consisting of ethylene/alpha-olefin copolymer having a density of less than or equal to 0.89 grams per cubic centimeter, a blend of homogeneous ethylene/alpha-olefin copolymer having a density ranging from about 0.89 to about 0.92 grams per cubic centimeter and the material from which said first exterior layer is formed, anhydride-modified ethylene/vinyl acetate copolymer, and anhydride-modified ethylene/methyl acrylate copolymer; and b) said second adhesive layer comprises a material selected from the group consisting of anhydride-modified ethylene/vinyl acetate copolymer, anhydride-modified ethylene/methyl acrylate copolymer, anhydride-modified ethylene/ethyl acrylate copolymer, anhydride-modified linear low density polyethylene, anhydride-modified very low density polyethylene, and anhydride-modified high density polyethylene.

18. The pouch of claim 17, wherein said first exterior layer comprises a blend of homopolymer or copolymer of polypropylene and elastomer, and said second exterior layer comprises copolyester or polyamide.

19. A pouch for the packaging and administration of medical solutions, said pouch comprising a multilayer film which comprises:
   a) an interior layer comprising a blend of two or more homogeneous ethylene/alpha-olefin copolymers wherein the density of said blend ranges from about 0.89 to about 0.92 grams per cubic centimeter;
   b) a first exterior layer comprising a material selected from the group consisting of a homopolymer or copolymer of polypropylene, a blend of homopolymer or copolymer of polypropylene and elastomer, high density polyethylene, and copolyester;
   c) a first adhesive layer positioned between said interior layer and said first exterior layer;
   d) a second exterior layer comprising a material selected from the group consisting of polyamide, copolyamide, polyester, copolyester, high density polyethylene, polypropylene, propylene/ethylene copolymer, and polycarbonate; and
   a second adhesive layer positioned between said interior layer and said second exterior layer.

20. The pouch of claim 19, wherein said blend of two or more homogeneous ethylene/alpha-olefin copolymers has a density ranging from about 0.90 to about 0.91 grams per cubic centimeter.

21. The pouch of claim 19, wherein said first adhesive layer comprises a material selected from the group consisting of ethylene/alpha-olefin copolymer having a density of less than or equal to 0.89 grams per cubic centimeter, a blend of homogeneous ethylene/alpha-olefin copolymer having a density ranging from about 0.89 to about 0.92 grams per cubic centimeter and the material from which said first exterior layer is formed, anhydride-modified ethylene/vinyl acetate copolymer, and anhydride-modified ethylene/methyl acrylate copolymer.

22. The pouch of claim 21, wherein
   said first exterior layer comprises a blend of homopolymer or copolymer of polypropylene and elastomer, and
   said second exterior layer comprises high density polyethylene.

23. The pouch of claim 19, wherein:
   a) said first adhesive layer comprises a material selected from the group consisting of ethylene/alpha-olefin copolymer having a density of less than or equal to 0.89 grams per cubic centimeter, a blend of homogeneous ethylene/alpha-olefin copolymer having a density ranging from about 0.89 to about 0.92 grams per cubic centimeter and the material from which said first exterior layer is formed, anhydride-modified ethylene/vinyl acetate copolymer, and anhydride-modified ethylene/methyl acrylate copolymer, and anhydride-modified ethylene/methyl acrylate copolymer; and
   b) said second adhesive layer comprises a material selected from the group consisting of anhydride-modified ethylene/vinyl acetate copolymer, anhydride-modified ethylene/methyl acrylate copolymer, anhydride-modified ethylene/ethyl acrylate copolymer, anhydride-modified linear low density polyethylene, anhydride-modified very low density polyethylene, and anhydride-modified high density polyethylene.

24. The pouch of claim 23, wherein
   said first exterior layer comprises a blend of homopolymer or copolymer of polypropylene and elastomer, and
   said second exterior layer comprises copolyester or polyamide.

* * * * *